United States Patent [19]

Otto et al.

[11] Patent Number: 5,371,334
[45] Date of Patent: Dec. 6, 1994

[54] METHOD OF ELECTRICAL DISCHARGE MACHINING CONTROL BY MONITORING GAP RESISTANCE

[76] Inventors: Mark Otto; Marjan Dobovsek, both of Teslova ulica 9, 6100 Ljubljana, Slovenia

[21] Appl. No.: 960,094

[22] Filed: Oct. 9, 1992

[30] Foreign Application Priority Data

Oct. 9, 1991 [EP] European Pat. Off. ........ 91117214.6

[51] Int. Cl.$^5$ .......................... B23H 1/02; B23H 7/18
[52] U.S. Cl. ............................ 219/69.16; 219/69.17; 219/69.19
[58] Field of Search ............... 219/69.13, 69.16, 69.18, 219/69.14, 69.17, 69.19

[56] References Cited

U.S. PATENT DOCUMENTS

| | | |
|---|---|---|
| 3,018,411 | 1/1962 | Webb . |
| 3,609,281 | 9/1971 | Kauffman ................. 219/69.13 |
| 3,699,301 | 10/1972 | Losey ...................... 219/69.13 |
| 4,251,706 | 2/1981 | Frei et al. ................ 219/69.14 |
| 4,367,400 | 1/1983 | Otto et al. ............... 219/69.16 |
| 4,376,880 | 3/1983 | Inoue ...................... 219/69.17 |
| 4,798,929 | 1/1989 | Itoh ........................ 219/69.19 |
| 4,822,970 | 4/1989 | Levy et al. .............. 219/69.16 |

FOREIGN PATENT DOCUMENTS

| | | | |
|---|---|---|---|
| 3023302 | 1/1981 | Germany ............... 219/69.16 |
| 56-152525 | 11/1981 | Japan ..................... 219/69.16 |
| 62-39119 | 2/1987 | Japan ..................... 219/69.16 |
| 3-136721 | 6/1991 | Japan ..................... 219/69.13 |
| 647180 | 1/1985 | Switzerland . |

Primary Examiner—Geoffrey S. Evans
Attorney, Agent, or Firm—Darby & Darby

[57] ABSTRACT

A pair of electrodes are spaced from one another so as to define a gap. One of the electrodes constitutes a workpiece to be machined and the other electrode constitutes a machining tool. To machine the workpiece, groups of electrical discharges are generated between the electrodes. The different groups are separated by pauses which are free of discharges, and the electrical resistance of the electrode gap is measured during the pauses. When the resistance decreases to a critical value, the lengths of the pauses and the spacing between the electrodes are increased until the resistance begins to increase from the critical value. Electrical discharge activity is continued during this time. In the event that these measures fail to cause an increase in the resistance so that the critical value is obtained during several pauses, the electrical discharges are stopped and the machining electrode is abruptly shifted away from the workpiece electrode. The distance moved by the machining electrode is proportional to the frequency of repetition of the critical value and to the period of time for which the resistance remains at such value.

20 Claims, 1 Drawing Sheet

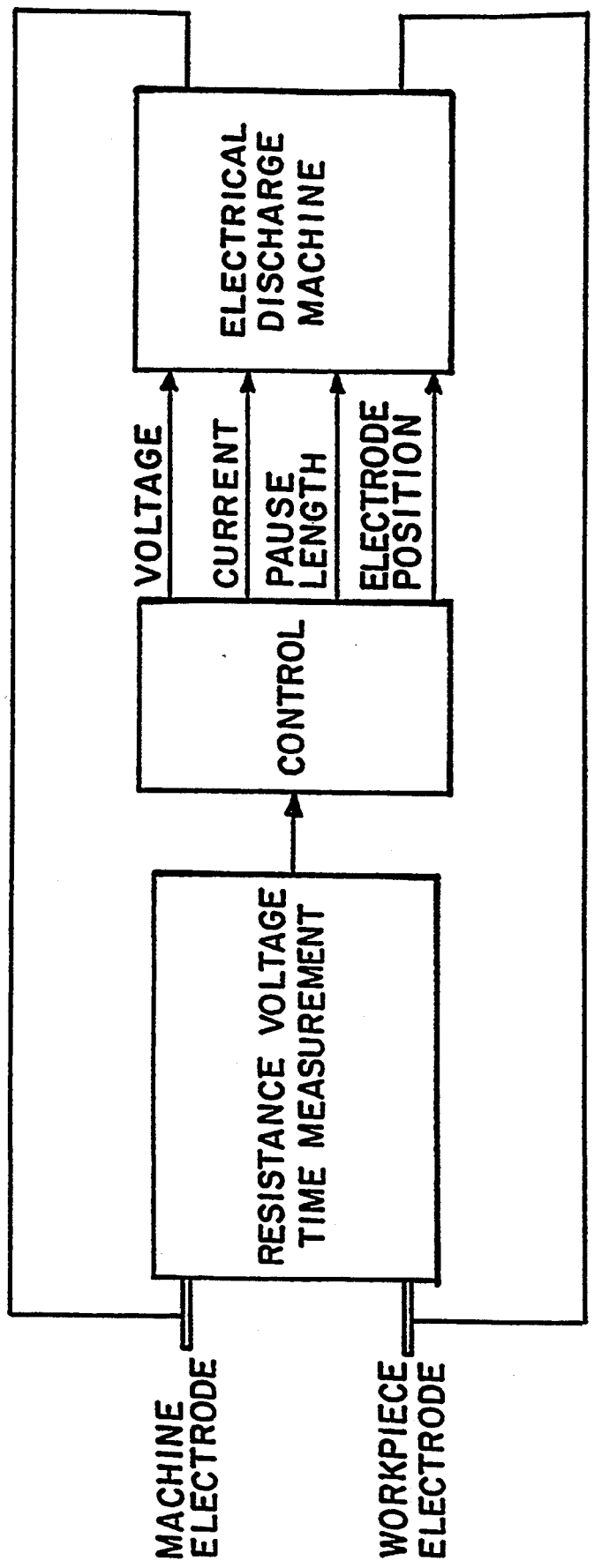

METHOD OF ELECTRICAL DISCHARGE MACHINING CONTROL BY MONITORING GAP RESISTANCE

BACKGROUND OF THE INVENTION

The invention relates generally to electrical discharge machining.

More particularly, the invention relates to the automatic control of electrical discharge machining.

Automatic control of electrical discharge machining is used to accelerate the erosion process and to increase the machining accuracy. It is further useful in preventing damage to components of complicated shape and components consisting of conductive materials which are difficult to machine.

Conventional automated control methods employ input signals which do not contain sufficient information to completely exclude electrode damage.

A method of automatically controlling electrical discharge machining of metals and alloys is known from the Swiss patent 647180. In this method, the amplitude of the alternating component of the electrical resistance in the gap defined by the machining electrode and the workpiece electrode, i.e., the electrode consisting of the metal or alloy to be machined, is periodically measured. The measurements are carried out during the pauses of uniform duration and frequency occurring between groups of electrical discharges. The amount of working fluid delivered to the machining zone is varied in dependence upon the results of the measurements.

In those cases where rinsing of the working fluid can be performed, the preceding method makes it possible to optimize the consumption of working fluid.

The modern tendency in the drain erosion process, however, is to manufacture relatively complicated articles without rinsing of the working fluid. Here, adaptive variations in current and regulation of the electrode spacing are the most important controls and provide the quickest response to changes in the process.

The method outlined above does not permit such a rapid response to be achieved. Thus, for effective analysis, it is necessary to have many measurements which are proportional to the amplitude of the alternating component of the electrical resistance in the gap defined by the electrodes.

The method described earlier also does not allow timely corrections in current to be realized because the duration of the pauses between groups of discharges is not regulated.

SUMMARY OF THE INVENTION

It is an object of the invention to provide a method which makes it possible to increase the rate of erosion during electrical discharge machining.

Another of the invention is to provide a method which is capable of reducing wear of the machining electrode during electrical discharge machining.

An additional object of the invention is to provide a method which allows electrode damage during electrical discharge machining to be reduced or eliminated.

A further object of the invention is to provide a method of automatically controlling electrical discharge machining so as to increase productivity.

It is also an object of the invention to provide an apparatus which enables the productivity of electrical discharge machining to be increased.

The preceding objects, as well as others which will become apparent as the description proceeds, are achieved by the invention.

One aspect of the invention resides in a method of machining one of a pair of spaced electrodes which define a gap. One of these electrodes may generally be considered to constitute a tool and will be referred to as the machining electrode while the other electrode, which is being machined, will be referred to as the workpiece electrode. The method comprises the steps of effecting at least one electrical discharge between the electrodes during each of a plurality of discharge periods which are separated by intervals free of discharges, i.e., by pauses; measuring the electrical resistance of the electrode gap during the pauses; and changing at least the lengths of the pauses when the resistance of the electrode gap decreases to a predetermined value.

The predetermined value may be a critical constant representing the concentration of discharges on a localized area of the working zone.

The step of changing at least the lengths of the pauses may be performed concurrently with the step of effecting discharges between the electrodes and may involve increasing the lengths of the pauses. The changing step is preferably carried out until such time as the resistance of the electrode gap begins to increase from the predetermined or critical value.

The step of changing at least the lengths of the pauses may further comprise varying the spacing between the electrodes. The electrode spacing can here be increased.

Under certain circumstances, the resistance of the electrode gap equals or approximates the critical value during two or more pauses. The method can then further comprise the step of abruptly moving the machining electrode through a distance which is substantially proportional to the length of time for which the resistance equals or approximates the critical value and/or to the number of pauses during which the resistance equals or approximates this value. The step of effecting discharges between the electrodes is preferably suspended during the step of moving the machining electrode. The machining electrode may be shifted away from the workpiece electrode.

The step of effecting discharges between the electrodes may involve generating a group of discharges during each of the discharge periods. These groups may be substantially identical.

The method may additionally comprise the step of ascertaining the voltage between the electrodes during the discharge periods. In the event that the magnitude and/or the wave-form of the voltage is abnormal during one part of a predetermined discharge period, e.g., during the first half of the predetermined discharge period, the method further comprises the step of interrupting the discharge current during a subsequent part of the predetermined discharge period. The interrupting step is preferably performed until the beginning of the period immediately following the predetermined period.

The method according to the invention may be utilized for automatic control of electrical discharge machining. In a preferred embodiment of the method, the results of the measurements of the resistance of the electrode gap and of the voltage between the electrodes are used to regulate the lengths of the pauses, the discharge current and the electrode spacing.

The method of the invention is particularly well-suited for the electrical discharge machining of substantially pure metals and of alloys.

One feature of the invention resides in that the pauses between groups of discharges are used not only for measurement of the electrical resistance of the gap defined by the electrodes but also for correction of the discharge current.

Another feature of the invention resides in that the distance moved by the machining electrode during abrupt shifting of the same depends upon the duration and/or the frequency of occurrence, i.e., the number of occurrences, of the critical value of the resistance of the gap.

The method of the invention makes it possible, when carrying out a machining operation without rinsing of the working fluid, to achieve maximum output with minimum wear of the machining electrode.

Switching off the discharge current during a discharge period when the discharge in the first half of the period is abnormal enables damage to the machining electrode, which is associated with slag formation in the machining zone, to be reduced or eliminated.

The novel features which are considered as characteristic of the invention are set forth in particular in the appended claims. The improved method itself, however, will be best understood upon perusal of the following detailed description of certain specific embodiments.

BRIEF DESCRIPTION OF THE DRAWING

FIG. 1 is a block diagram of the electrical discharge machine control circuitry used to carry out the invention.

DESCRIPTION OF THE PREFERRED EMBODIMENTS

A workpiece having sharp edges and a complicated shape was electrical discharge machined without rinsing of the working fluid. The workpiece was installed as an electrode at a spacing from a second or machining electrode constituting a tool. The working surface of the machining electrode was varied by division from 0.5 square millimeter to 500 square millimeters. In this manner, a breakdown depth of 50 millimeters, with a surface roughness of approximately 1.6 micrometers, was achieved in the rough, preliminary finish and final finish regimes.

Machining was accomplished by essentially identical groups of electrical discharges separated by intervals free of discharges. During these intervals or pauses, the electrical resistance of the gap defined by the electrodes was measured. On the other hand, the parameters of the voltage generated between the electrodes (voltage amplitude, shape of the voltage curve, voltage oscillation, and so on) were measured during the periods of discharge.

The electrical resistance of the electrode gap was found to decrease as machining proceeded. When the resistance reached a predetermined critical constant corresponding to the concentration of the discharges on a localized area of the working zone, the lengths of the pauses between the groups of discharges and the spacing between the electrodes were increased until the resistance of the electrode gap increased. The pause length and electrode spacing were increased without interrupting the machining process, i.e., while continuing with the electrical discharges.

At a certain point, the electrical resistance of the electrode gap failed to increase in response to an increase in pause length and electrode spacing and the electrical resistance of the electrode gap remained at or near the critical value during several pauses. In this situation, the machining process was interrupted, i.e., the electrical discharges were discontinued, and the machining electrode was rapidly or abruptly shifted away from the workpiece electrode. The machining electrode was shifted through a distance proportional to the frequency of repetition of the critical value of the electrical resistance, i.e., to the number of pauses for which the electrical resistance remained at or near the critical value, and to the period of time for which the electrical resistance remained at or near such value.

On occasion, the amplitude and/or wave-form of the voltage between the electrodes was found to be abnormal during the first half of a discharge period. The discharge current was then interrupted until the electrical discharges in the next period began.

The current density was relatively high (up to 10 amps per square centimeter) at small operating depths and 5 to 8 percent of the discharges were abnormal. They were discontinued without worsening the erosion process.

As the operating depth for the workpiece increased (to between 5 and 7 millimeters), the stability of the erosion process degenerated and the electrical resistance of the electrode gap fell to the critical value. The lengths of the pauses between the groups of discharges and the spacing between the electrodes were then increased to values which caused the electrical resistance of the electrode gap to increase. The spacing between the electrodes was increased using an electrode spacing control unit.

At an operating depth of 10 to 12 millimeters, however, these measures no longer had any significant effect on the electrical resistance of the electrode gap. The machining electrode was then rapidly or abruptly shifted away from the workpiece electrode in the manner described previously, i.e., so that the distance moved by the machining electrode was proportional to the frequency of repetition of the critical value of the electrical resistance and to the period of time for which the electrical resistance remained at or near the critical value. This allowed machining without rinsing of the workpiece to proceed to a depth of 50 millimeters with no damage to the machining electrode. Simultaneously, the rate of erosion and the machining precision increased by 50 to 70 percent.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of machining one of a pair of spaced electrodes which define a gap, comprising the steps of effecting at least one electrical discharge between said electrodes during each of a plurality of discharge periods which are separated by intervals free of discharges; measuring the electrical resistance of said gap during said intervals; changing at least the lengths of said intervals when said resistance decreases to a predetermined value, and abruptly moving a selected electrode through a distance which is substantially proportional to a ratio of a number of the plurality of said intervals during which the resistance is substantially at said predetermined value to the total number of said intervals.

2. The method of claim 1, wherein said predetermined value is a critical constant representing the concentration of discharges on a localized area of the working zone.

3. The method of claim 1, wherein the changing step is performed concurrently with the effecting step.

4. The method of claim 1, wherein the changing step is performed until said resistance begins to increase from said predetermined value.

5. The method of claim 1, wherein the changing step includes increasing the lengths of said intervals.

6. The method of claim 1, wherein the changing step further comprises varying the spacing between said electrodes.

7. The method of claim 6, wherein the changing step includes increasing said spacing.

8. The method of claim 1, wherein said one electrode comprises a substantially pure metal or an alloy.

9. The method of claim 1, wherein the effecting step is suspended during the moving step.

10. The method of claim 1, wherein the moving step includes shifting said selected electrode away from the other electrode.

11. The method of claim 1, wherein said selected electrode is the other of said electrodes.

12. The method of claim 1, further comprising the step of ascertaining the voltage between said electrodes during said periods and the step of interrupting the discharge current during a selected part of a predetermined discharge period when at least one of the magnitude and wave-form of said voltage is abnormal during a preceding part of said predetermined period.

13. The method of claim 12, wherein said preceding part is the first half of said predetermined period.

14. The method of claim 12, wherein the interrupting step is performed until the beginning of the period immediately following said predetermined period.

15. The method of claim 1, wherein the effecting step includes generating a group of discharges during each of said periods.

16. The method of claim 15, wherein said groups are substantially identical.

17. A method of machining one of a pair of spaced electrodes which define a gap, comprising the steps of effecting at least one electrical discharge between said electrodes during each of a plurality of discharge periods which are separated by intervals free of discharges: measuring the electrical resistance of said gap during said intervals; changing at least the lengths of said intervals when said resistance decreases to a predetermined value and when said resistance has substantially said predetermined value during a number of said intervals, abruptly moving a selected electrode through a distance which is substantially proportional to said number.

18. The method of claim 17, wherein the effecting step is suspended during the moving step.

19. The method of claim 17, wherein the moving step includes shifting said selected electrode away from the other electrode.

20. The method of claim 17, wherein said selected electrode is the other of said electrodes.

* * * * *